United States Patent
Matsuda et al.

(10) Patent No.: US 9,653,960 B2
(45) Date of Patent: May 16, 2017

(54) MOTOR AND BLOWER

(71) Applicant: Nidec Corporation, Kyoto (JP)

(72) Inventors: Shigekatsu Matsuda, Kyoto (JP); Keizo Furukawa, Kyoto (JP); Kazuya Kitaji, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 226 days.

(21) Appl. No.: 14/688,035

(22) Filed: Apr. 16, 2015

(65) Prior Publication Data

US 2015/0311766 A1 Oct. 29, 2015

(30) Foreign Application Priority Data

Apr. 26, 2014 (JP) .................. 2014-092164

(51) Int. Cl.
*H02K 5/00* (2006.01)
*H02K 5/15* (2006.01)
*H02K 5/24* (2006.01)
*F04D 19/00* (2006.01)
*F04D 25/06* (2006.01)
*F04D 25/08* (2006.01)
*F04D 29/053* (2006.01)
*F04D 29/32* (2006.01)
*F04D 29/38* (2006.01)
*H02K 5/16* (2006.01)
*H02K 5/173* (2006.01)
(Continued)

(52) U.S. Cl.
CPC ............. *H02K 5/15* (2013.01); *F04D 19/002* (2013.01); *F04D 25/06* (2013.01); *F04D 25/08* (2013.01); *F04D 29/053* (2013.01); *F04D 29/325* (2013.01); *F04D 29/38* (2013.01); *H02K 5/161* (2013.01); *H02K 5/1732* (2013.01); *H02K 5/24* (2013.01); *H02K 7/083* (2013.01); *H02K 29/08* (2013.01)

(58) Field of Classification Search
CPC .................................. H02K 5/04; H02K 5/15
USPC ................... 310/89, 400–402, 406, 411, 415
See application file for complete search history.

(56) References Cited

U.S. PATENT DOCUMENTS 2,372,453 A * 3/1945 Sherman .................. H02K 9/06
310/270
2,811,659 A 10/1957 Barlow et al.
(Continued)

FOREIGN PATENT DOCUMENTS

JP 2013-099094 A 5/2013
JP 2014-039429 A 2/2014

*Primary Examiner* — Thanh Lam
(74) *Attorney, Agent, or Firm* — Keating & Bennett, LLP (57) ABSTRACT

An inner-rotor motor includes a shaft, a rotor magnet, a stator, a housing including a housing tubular portion extending along a rotation axis, a cap, and a bearing portion. The cap is located above the housing, and includes a cap bottom portion and a cap tubular portion which extends downward from the cap bottom portion. A core back of the stator includes a tubular outer circumferential surface including a plurality of stator contact portions in contact with the housing tubular portion. The stator contact portions are spaced from one another in a circumferential direction. The cap tubular portion includes a plurality of cap contact portions in contact with the housing and spaced from one another in the circumferential direction. At least one of the cap contact portions is located at a circumferential position different from a circumferential position of each stator contact portion.

21 Claims, 6 Drawing Sheets

(51) Int. Cl.
*H02K 7/08* (2006.01)
*H02K 29/08* (2006.01)

(56) References Cited

U.S. PATENT DOCUMENTS

| | | | |
|---|---|---|---|
| 5,097,168 A * | 3/1992 | Takekoshi | H02K 1/16 310/194 |
| 5,113,103 A * | 5/1992 | Blum | H02K 5/04 310/402 |
| 5,767,596 A * | 6/1998 | Stark | H02K 5/00 29/596 |
| 5,998,904 A * | 12/1999 | Hattori | H02K 1/165 310/156.19 |
| 6,021,993 A | 2/2000 | Kirkwood | |
| 7,042,124 B2 * | 5/2006 | Puterbaugh | H02K 5/10 310/43 |
| 2003/0042804 A1 | 3/2003 | Cook et al. | |
| 2004/0178692 A1* | 9/2004 | Wright | H02K 5/15 310/216.004 |
| 2005/0115055 A1* | 6/2005 | Kimura | F01C 21/10 29/596 |
| 2008/0258668 A1 | 10/2008 | Oguri et al. | |

\* cited by examiner

MOTOR AND BLOWER

BACKGROUND OF THE INVENTION

1. Field of the Invention

The present invention relates to a motor and a blower.

2. Description of the Related Art

In a motor including an armature, an electric drive current causes exciting vibrations in the armature. Moreover, the motor as a whole vibrates when a rotating portion of the motor is rotating. Such vibrations cause noise.

In recent years, with an increase in the number of electronic devices used in homes and workplaces, there has been a demand for reducing noise caused by various electronic devices, such as, for example, household electrical appliances and office automation appliances. Various techniques have been devised to reduce noise of motors, such as, for example, using inner-rotor motors and arranging as many parts of the motors as possible inside cases thereof. A known motor is described, for example, in JP-A 2013-99094.

However, it is difficult to prevent resonance of parts of a motor by simply arranging as many parts of the motor as possible inside a case of the motor. Accordingly, if the rotation rate of the motor is varied in a stepless manner, the rotation rate of the motor reaches a rotation rate which causes increased vibration due to resonance at some point, causing the motor to vibrate greatly.

SUMMARY OF THE INVENTION

A motor according to a preferred embodiment of the present invention includes a shaft which extends along a rotation axis extending in a vertical direction; a rotor magnet configured to rotate together with the shaft; a stator located radially outside of the rotor magnet; a housing including a housing tubular portion which extends along the rotation axis; a cap located at an axially upper end portion of the housing; and a bearing portion configured to rotatably support the shaft, and supported by at least one of the housing and the cap. The stator includes a stator core including an annular core back and a plurality of teeth which project radially inward from the core back. The core back includes a tubular outer circumferential surface, the outer circumferential surface including a plurality of stator contact portions each of which is in contact with the housing tubular portion. The stator contact portions are spaced from one another in a circumferential direction. The cap includes a cap bottom portion that is perpendicular or substantially perpendicular to the rotation axis; and a cap tubular portion which extends axially downward from the cap bottom portion. The cap tubular portion includes a plurality of cap contact portions each of which is in contact with the housing. The cap contact portions are spaced from one another in the circumferential direction. At least one of the cap contact portions is located at a circumferential position different from a circumferential position of each stator contact portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel or substantially parallel to a rotation axis of a motor is referred to by term "axial direction", "axial", or "axially", that directions perpendicular or substantially perpendicular to the rotation axis of the motor are referred to by the term "radial direction", "radial", or "radially", and that a direction along a circular arc centered on the rotation axis of the motor is referred to by the term "circumferential direction", "circumferential", or "circumferentially". It is also assumed herein that an axial direction is a vertical direction, and that a side on which a cap is arranged with respect to a housing is defined as an upper side. The shape of each member or portion and relative positions of different members or portions will be described based on the above assumptions. It should be noted, however, that the above definitions of the vertical direction and the upper and lower sides are made simply for the sake of convenience in description, and should not be construed to restrict in any way the orientation of a motor according to any preferred embodiment of the present invention when in use.

Figure 1:
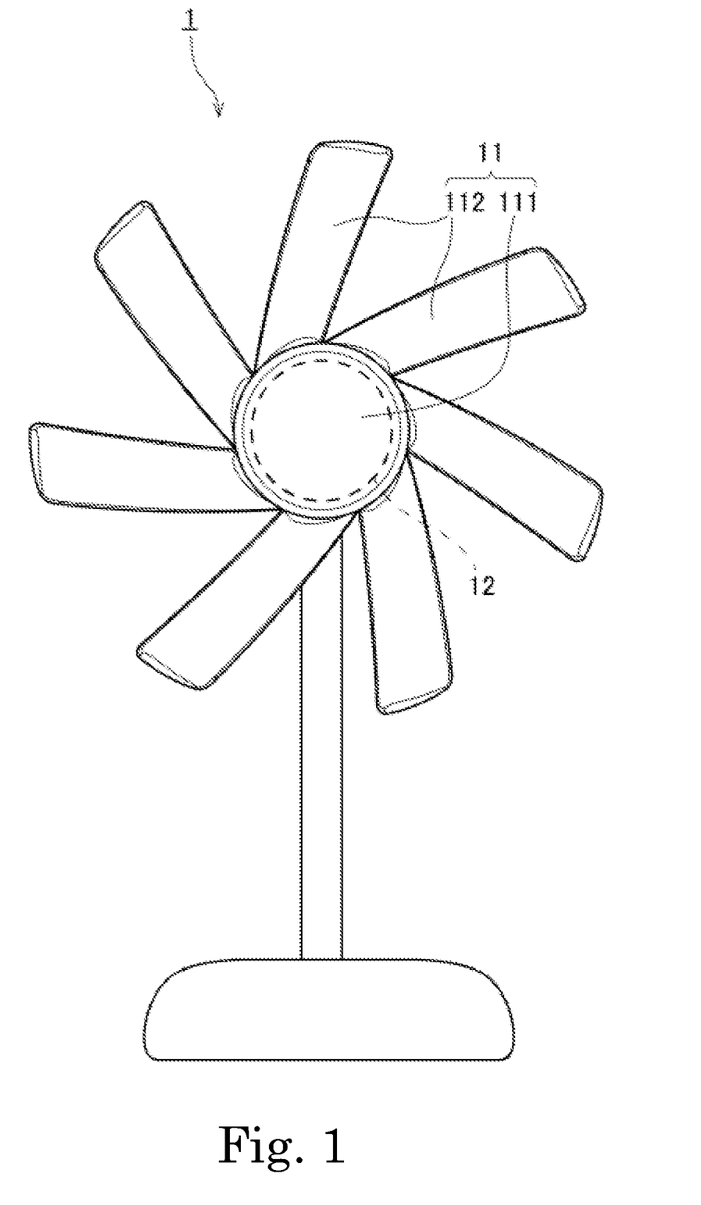
FIG. 1 is a front view of a blower according to a first preferred embodiment of the present invention.
Figure 2:
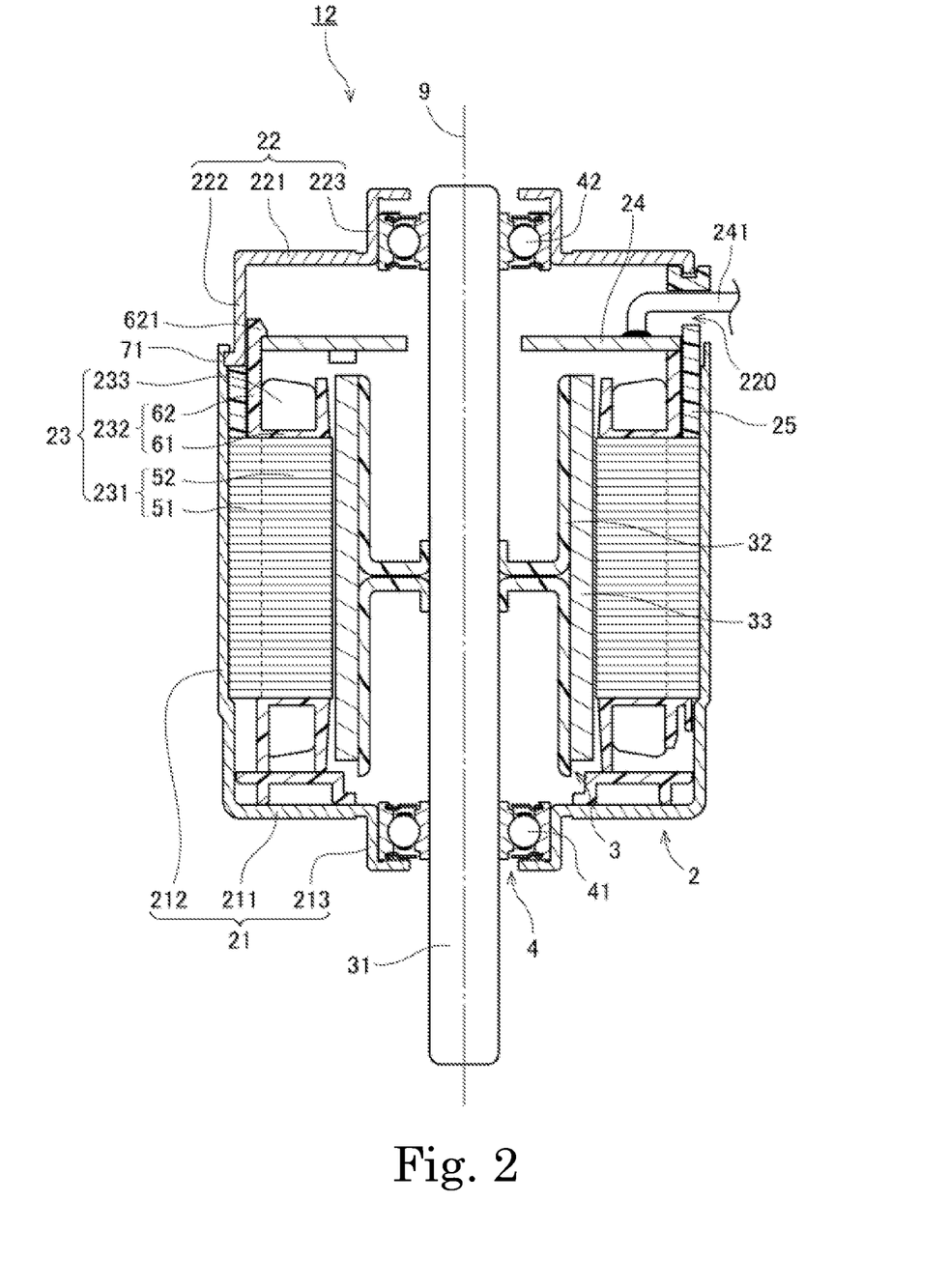
FIG. 2 is a vertical cross-sectional view of a motor according to the first preferred embodiment of the present invention.

FIG. 1 is a front view of a blower 1 according to a preferred embodiment of the present invention. FIG. 2 is a vertical cross-sectional view of a motor 12 according to a preferred embodiment of the present invention. The blower 1 is an apparatus configured to rotate an impeller 11 with power of the motor 12 to send a wind to a space in front of the impeller 11. The blower 1 is used as, for example, a fan which is used to apply a wind directly to a user to cool the user. In addition, the blower 1 may be used as a circulator which is used together with an air conditioner or the like.

Referring to FIG. 1, the blower 1 according to the present preferred embodiment includes an axial flow impeller 11 and the motor 12. The impeller 11 preferably includes a central portion 111 and a plurality of blades 112. The central portion 111 is a portion in the shape of a cup with a closed back. The plurality of blades 112 extends radially outward from the central portion 111. The number of blades 112 included in the impeller 11 according to the present preferred embodiment is preferably seven, for example, but any other desirable number of blades 112 could be used.

The motor 12 is configured to supply power for rotation to the impeller 11. The motor 12 is accommodated inside the central portion 111 of the impeller 11. The motor 12 is preferably arranged such that a lower side of the motor 12 faces a front side of the blower 1. A lower end portion of a shaft 31 of the motor 12, which will be described below, is fixed to the central portion 111. As a result, once the motor 12 is driven, the impeller 11 starts rotating together with a rotating portion 3 of the motor 12, which will be described below.

Referring to FIG. 2, the motor 12 preferably includes a stationary portion 2, the rotating portion 3, and a bearing portion 4. The stationary portion 2 is stationary relative to a frame of the blower 1. The rotating portion 3 is rotatable about a rotation axis 9 with respect to the stationary portion 2.

The stationary portion 2 according to the present preferred embodiment preferably includes a housing 21, a cap 22, a stator 23, and a circuit board 24.

The housing 21 preferably includes a housing bottom portion 211, a housing tubular portion 212, and a first bearing holding portion 213. The housing bottom portion 211 is perpendicular or substantially perpendicular to the rotation axis 9. The housing tubular portion 212 is tubular, and extends axially upward from the housing bottom portion 211 along the rotation axis 9. The first bearing holding portion 213 projects downward from the housing bottom portion 211. An outer circumferential surface of a lower ball bearing 41, which will be described below, of the bearing portion 4 is fixed inside the first bearing holding portion 213.

The cap 22 preferably includes a cap bottom portion 221, a cap tubular portion 222, and a second bearing holding portion 223. The cap bottom portion 221 is perpendicular or substantially perpendicular to the rotation axis 9. The cap tubular portion 222 is tubular, and extends axially downward from the cap bottom portion 221 along the rotation axis 9. The second bearing holding portion 223 projects upward from the cap bottom portion 221. An outer circumferential surface of an upper ball bearing 42, which will be described below, of the bearing portion 4 is fixed inside the second bearing holding portion 223.

The stator 23, at least a portion of the circuit board 24, and a magnet holder 32 and a rotor magnet 33 of the rotating portion 3 are preferably accommodated inside a case defined by the housing 21 and the cap 22. The magnet holder 32 and the rotor magnet 33 will be described below. Each of the housing 21 and the cap 22 is preferably made of, for example, a galvanized steel sheet, SUS, or the like. The housing 21 and the cap 22 according to the present preferred embodiment are preferably made of the same material. Note that the housing 21 and the cap 22 may be made of different materials.

The stator 23 is an armature preferably defined by a stator core 231, an insulator 232, and coils 233. The stator 23 is located radially outside of the rotor magnet 33.

The stator core 231 is preferably defined by laminated steel sheets, i.e., electromagnetic steel sheets, such as silicon steel sheets, placed one upon another in an axial direction. The stator core 231 includes an annular core back 51 and a plurality of teeth 52 which project radially inward from the core back 51. An outer circumferential surface of the core back 51 is fixed to an inner circumferential surface of the housing tubular portion 212. The plurality of teeth 52 is located at regular or substantially regular intervals in a circumferential direction.

The insulator 232 is preferably a member made of a resin and arranged to cover a portion of a surface of the stator core 231. The insulator 232 according to the present preferred embodiment includes a cover portion 61 arranged to cover an upper end surface of the stator core 231, and a board support portion 62 which projects upward from the cover portion 61. The board support portion 62 preferably includes a claw portion 621 which projects perpendicularly or substantially perpendicularly to the axial direction.

Each of the coils 233 is wound around a separate one of the teeth 52 with the insulator 232 intervening therebetween. Each coil 233 is defined by a conducting wire wound around a corresponding one of the teeth 52 with the insulator 232 intervening therebetween.

The circuit board 24 is configured to supply electric drive currents to the coils 233 of the stator 23. The circuit board 24 according to the present preferred embodiment is preferably located in a space enclosed by the housing 21 and the cap 22. In addition, the circuit board 24 is located above the stator core 231 and perpendicular or substantially perpendicular to the rotation axis 9. An upper surface of the circuit board 24 is located at an axial level higher than an axial level of an upper end portion of the housing 21. As a result, in a manufacturing process, it is easy to perform a soldering operation or the like on an electronic circuit on the circuit board 24 even after the circuit board 24, the housing 21, and the stator 23 are assembled together. That is, manufacturing efficiency is improved.

The circuit board 24 according to the present preferred embodiment preferably is fixed to the board support portion 62 of the insulator 232 through, for example, snap fitting. That is, the circuit board 24 and the claw portion 621 of the board support portion 62 are preferably fixed to each other through snap fitting.

It is desirable that the lamination thickness of the stator core 231, i.e., the number of electromagnetic steel sheets which define the stator core 231, be variable depending on the intended purpose of the motor 12.

A plurality of Hall sensors 240 are preferably mounted on the circuit board 24 according to the present preferred embodiment. The Hall sensors 240 are configured to detect the circumferential position of the rotor magnet 33, and perform feedback to enable appropriate drive control of the motor 12. Therefore, based on the assumption that the distance between the circuit board 24 and an upper surface of the stator core 231 is fixed, a change in the lamination thickness of the stator core 231 may change relative positions of the circuit board 24 and the rotor magnet 33, which may make accurate detection of the circumferential position of the rotor magnet 33 difficult.

In addition, based on the assumption that the distance between the circuit board 24 and the upper surface of the stator core 231 is fixed, a reduction in the lamination thickness of the stator core 231 may cause the upper surface of the circuit board 24 to be located at an axial level lower than an axial level of the upper end portion of the housing 21. This will make it difficult to perform the soldering operation or the like on the electronic circuit on the circuit board 24.

According to the present preferred embodiment, providing the board support portion 62 in the insulator 232 preferably makes it possible to fix the position of the circuit board 24 relative to each of the rotor magnet 33 and the housing 21 regardless of the lamination thickness of the stator core 231. Thus, it is possible to fix the distance between each of the Hall sensors 240 mounted on the circuit board 24 and the rotor magnet 33, which will prevent a reduction in accuracy with which the circumferential position of the rotor magnet 33 is detected by the Hall sensors 240. Moreover, a decrease in efficiency with which the soldering operation or the like is performed on the electronic circuit on the circuit board 24 is prevented.

In addition, the cap tubular portion 222 of the cap 22 according to the present preferred embodiment preferably includes an external connection portion 220. The external connection portion 220 is a cut that passes through the cap tubular portion 222 in a radial direction. Each of a plurality of cap contact portions 71 is located at a circumferential position different from the circumferential position of the external connection portion 220. A lead wire 241 connected to the circuit board 24 is provided in the external connection portion 220. Note that a portion of the circuit board 24 or a connector may be provided in the external connection portion 220. Also note that the external connection portion 220 may be a hole passing through the cap tubular portion 222 in a radial direction. Thus, the circuit board 24 is electrically connected to an external device through the external connection portion 220, so that the electric drive currents necessary to drive the motor 12 are supplied to the circuit board 24.

The rotating portion 3 according to the present preferred embodiment preferably includes the shaft 31, the magnet holder 32, and the rotor magnet 33.

The shaft 31 is a columnar member extending along the rotation axis 9. A metal, such as, for example, stainless steel, is preferably used as a material of the shaft 31. The shaft 31 is configured to rotate about the rotation axis 9 while being supported by the bearing portion 4. The lower end portion of the shaft 31 projects downward below the housing 21. The lower end portion of the shaft 31 is fixed to the central portion 111 of the impeller 11.

The magnet holder 32 is a member made of a resin and configured to rotate together with the shaft 31. An inner circumferential surface of the magnet holder 32 is fixed to the shaft 31, while an outer circumferential surface of the magnet holder 32 is fixed to an inner circumferential surface of the rotor magnet 33.

The rotor magnet 33 is an annular magnet configured to rotate together with the shaft 31. An outer circumferential surface of the rotor magnet 33 is located radially opposite to an inner end of each of the plurality of teeth 52 of the stator core 231. In addition, the outer circumferential surface of the rotor magnet 33 includes north and south poles arranged to alternate with each other in the circumferential direction. Note that, in place of the annular rotor magnet 33, a plurality of magnets may be used. In this case, the plurality of magnets are arranged in the circumferential direction such that north and south pole surfaces alternate with each other.

The bearing portion 4 includes the lower ball bearing 41 and the upper ball bearing 42. As described above, the outer circumferential surfaces of the lower ball bearing 41 and the upper ball bearing 42 are fixed to the housing 21 and the cap 22, respectively. In addition, an inner circumferential surface of each of the lower ball bearing 41 and the upper ball bearing 42 is fixed to an outer circumferential surface of the shaft 31. The bearing portion 4 is thus configured to rotatably support the shaft 31. Note that, although the bearing portion 4 according to the present preferred embodiment is preferably defined by ball bearings, this is not essential to the present invention. The bearing portion 4 may alternatively be defined by a bearing mechanism of another type, such as, for example, a plain bearing or a fluid bearing.

Once the electric drive currents are supplied to the coils 233 through the circuit board 24, radial magnetic flux is generated around each of the teeth 52 of the stator core 231. Then, a circumferential torque is produced by interaction between the magnetic flux of the teeth 52 and magnetic flux of the rotor magnet 33, so that the rotating portion 3 is caused to rotate about the rotation axis 9 with respect to the stationary portion 2. Once the rotating portion 3 starts rotating, the impeller 11 joined to the shaft 31 starts rotating to produce an air current traveling from a space at the back of the impeller 11 to the space in front of the impeller 11.

Figure 3:
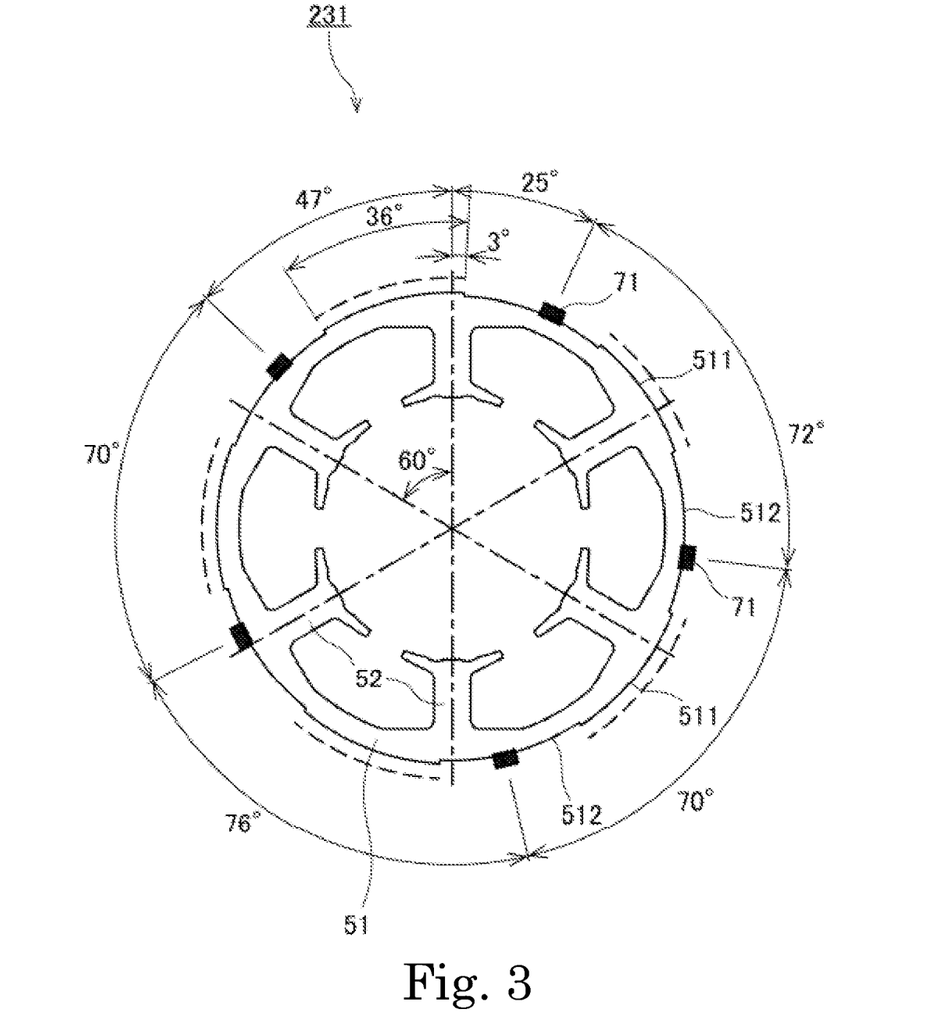
FIG. 3 is a horizontal cross-sectional view of a stator core according to the first preferred embodiment of the present invention.

Next, positions at which various portions of the motor 12 are fixed, and manners of fixing the various portions will be described below. FIG. 3 is a horizontal cross-sectional view of the stator core 231. In the motor 12, vibrations which cause noise are transferred through positions at which different members are fixed to each other or are in contact with each other. Therefore, it is preferably possible to prevent resonance of different members by appropriately arranging the positions at which the different members are fixed to each other or are in contact with each other.

As described above, the outer circumferential surface of the core back 51 of the stator core 231 and the inner circumferential surface of the housing tubular portion 212 are fixed to each other. Accordingly, vibrations which are caused by action of the magnetic flux in the coils 233 and the teeth 52 are preferably transferred to the housing 21 through the outer circumferential surface of the stator core 231. In addition, vibrations which are caused by rotation of the rotating portion 3 are transferred to the housing 21 and the cap 22 through the bearing portion 4.

Referring to FIG. 3, the tubular outer circumferential surface of the core back 51 includes a plurality of stator contact portions 511 and a plurality of non-contact portions 512. Each of the stator contact portions 511 projects radially outward relative to each of the non-contact portions 512, which are remaining portions of the outer circumferential surface of the core back 51. The plurality of stator contact portions 511 are spaced from one another in the circumferential direction. That is, the stator contact portions 511 and the non-contact portions 512 are arranged to alternate with each other in the circumferential direction.

The stator core 231 is preferably fixed to the housing 21 as a result of the core back 51 being, for example, press fitted to the inner circumferential surface of the housing tubular portion 212. Thus, each stator contact portion 511 is in contact with the inner circumferential surface of the housing tubular portion 212, while each non-contact portion 512 is arranged to be out of contact with the housing tubular portion 212. Note that, although the stator core 231 and the housing 21 are fixed to each other through press fitting according to the present preferred embodiment, the stator core 231 and the housing 21 may be fixed to each other by any other desirable method, such as, for example, adhesion or a combination of press fitting and adhesion.

Referring to FIG. 2, the cap tubular portion 222 of the cap 22 preferably includes the plurality of cap contact portions 71, each of which is in contact with the housing 21. According to the present preferred embodiment, the housing 21 is fixed to the cap 22 by crimping. Specifically, a portion of the housing tubular portion 212 in the vicinity of an upper end portion thereof is partially plastically deformed radially inward to fix the housing to the cap contact portions 71, which are arranged in the vicinity of a lower end portion of the cap tubular portion 222. In FIG. 3, the circumferential positions of the cap contact portions 71 are shown with examples of preferred angles of arrangement. As illustrated in FIG. 3, the plurality of cap contact portions 71 are spaced from one another in the circumferential direction.

As illustrated in FIG. 3, the circumferential middle of each of the stator contact portions 511 and the circumferential middle of each of the teeth 52 are located at different circumferential positions. Arranging the circumferential middle of at least one of the stator contact portions 511 and the circumferential middle of each of the teeth 52 at different circumferential positions as described above contributes to preventing vibrations which are caused at the coils 233 and the teeth 52 from being amplified and transferred to the housing 21. As a result, a reduction in vibrations of the motor 12 is achieved. Moreover, according to the present preferred embodiment, the circumferential middle of each of all the stator contact portions 511 and the circumferential middle of each of the teeth 52 are located at different circumferential positions. As a result, a further reduction in the vibrations of the motor 12 is achieved.

In addition, each of the cap contact portions 71 is located at a circumferential position different from the circumferential position of each stator contact portion 511. Arranging at least one of the cap contact portions 71 at a circumferential position different from the circumferential position of each stator contact portion 511 as described above contributes to preventing vibrations which have been transferred from the stator 23 to the housing 21 through the stator contact portions 511 from being transferred to the cap 22 as they are. Thus, vibration characteristics of the vibrations which have been transferred from the stator 23 to the housing 21 through the stator contact portions 511 and vibration characteristics of the vibrations which are transferred from the housing 21 to the cap 22 through the cap contact portions 71 are different from each other. This contributes to preventing or minimizing resonance of the housing 21 and the cap 22, and to reducing or preventing the vibrations of the motor 12.

In particular, according to the present preferred embodiment, each of all the cap contact portions 71 is located at a circumferential position different from the circumferential position of each stator contact portion 511. As a result, the likelihood that the resonance of the housing 21 and the cap 22 will occur is further reduced.

In addition, an upper portion of the housing tubular portion 212 tends to easily have increased vibrations compared to a lower portion of the housing tubular portion 212. Further, portions of the housing tubular portion 212 which do not circumferentially overlap with any stator contact portion 511 are not fixed by the stator 51, and, therefore, particularly tend to have increased vibrations. The cap contact portions 71 are in contact with the portions of the housing tubular portion 212 which tend to have increased vibrations to fix the housing tubular portion 212 to the cap 22, and this contributes to reducing vibrations of the housing tubular portion 212. As a result, a further reduction in the vibrations of the motor 12 is achieved.

Here, according to the present preferred embodiment, the number of stator contact portions 511 is preferably five, while the number of teeth 52 is preferably six, for example. That is, the number of teeth 52 and the number of stator contact portions 511 are relatively prime (i.e., do not contain common multiples). This contributes to preventing resonance of the stator core 231 and the housing 21. Moreover, according to the present preferred embodiment, the number of cap contact portions 71 is preferably five, for example. That is, the number of teeth 52 and the number of cap contact portions 71 are relatively prime (i.e., do not contain common multiples). This contributes to preventing resonance of the stator core 231 and the cap 22. As a result, a further reduction in the vibrations of the motor 12 is achieved.

Thus, both the number of stator contact portions 511 and the number of cap contact portions 71 are preferably prime numbers equal to or greater than five. The number of teeth 52 is a multiple of three in the case of a three-phase motor, and a multiple of two in the case of a two-phase motor, for example. Therefore, when both the number of stator contact portions 511 and the number of cap contact portions 71 are prime numbers equal to or greater than five, the likelihood that the housing 21 or the cap 22 will resonate with the stator core 231 is reduced.

In addition, the stator contact portions 511 are arranged to be axially (i.e., rotationally) symmetrical with respect to the rotation axis 9. In other words, the stator contact portions 511 are located at regular intervals in the circumferential direction. Thus, positions at which the stator core 231 and the housing 21 are press fitted to each other are located at regular intervals in the circumferential direction, and this contributes to preventing the stator core 231 from becoming unevenly deformed due to the press fitting. This contributes to preventing a deterioration in magnetic characteristics of the motor 12 due to the press fitting.

Meanwhile, according to the present preferred embodiment, the cap contact portions 71 are preferably arranged to be asymmetrical with respect to the rotation axis 9 (i.e., rotationally asymmetrical). In other words, the cap contact portions 71 are located at irregular intervals in the circumferential direction. When the cap contact portions 71 are arranged to be axially asymmetrical with respect to the rotation axis 9 as described above, it is possible to reduce the likelihood that the housing 21, the cap 22, and the stator 23 will resonate with one another even in the case where the number of stator contact portions 511 and the number of cap contact portions 71 are equal to each other, or in the case where the number of teeth 52 and the number of cap contact portions 71 are equal to each other.

As illustrated in FIG. 3, the circumferential width of each stator contact portion 511 is greater than the circumferential width of each of the teeth 52 and the circumferential width of each cap contact portion 71. In addition, the combined circumferential width of the stator contact portions 511 is greater than the combined circumferential width of the non-contact portions 512. A strength with which the housing 21 and the stator are fixed to each other is increased by maximizing the circumferential width of each stator contact portion 511 as described above. As a result, the rigidity of the housing 21 and the stator 23 is improved, and a further reduction in the vibrations of the motor 12 is achieved.

In addition, as illustrated in FIG. 2, the housing tubular portion 212 preferably has an axial dimension greater than the axial dimension of the stator core 231. Moreover, each stator contact portion 511 preferably extends from an upper end portion to a lower end portion of the outer circumferential surface of the core back 51. The axial dimension of each stator contact portion 511 is thus maximized to further increase the strength with which the housing 21 and the stator 23 are fixed to each other. As a result, the rigidity of the housing 21 and the stator 23 is improved, and a further reduction in the vibrations of the motor 12 is achieved.

As described above, according to the present preferred embodiment, two ball bearings, the lower ball bearing 41 and the upper ball bearing 42, are used as the bearing portion 4. The number of balls used in each of the lower ball bearing 41 and the upper ball bearing 42 according to the present preferred embodiment is preferably seven, for example. That is, the number of balls used in each ball bearing of the bearing portion 4 and the number of teeth 52 are relatively prime (i.e., do not contain common multiples). This contributes to preventing vibrations which are transferred from the shaft 31 to the housing 21 and the cap 22 and vibrations which are transferred from the teeth 52 to the housing 21 and the cap 22 from resonating with each other to be amplified.

In addition, according to the present preferred embodiment, the first bearing holding portion 213, which is configured to hold the lower ball bearing 41, projects downward below the housing bottom portion 211, and the second bearing holding portion 223, which is configured to hold the upper ball bearing 42, projects upward above the cap bottom portion 221. This contributes to increasing the axial distance between the lower ball bearing 41 and the upper ball bearing 42. Thus, the likelihood that the shaft 31 will be tilted is reduced, and vibrations due to a tilt of the shaft 31 are significantly reduced or prevented. That is, the vibrations of the motor 12 are significantly reduced or prevented.

Further, according to the present preferred embodiment, a vibration isolator 25 is preferably provided between a lower end surface of the cap 22 and an upper end surface of the stator core 231. The vibration isolator 25 is preferably provided in a space which faces the housing 21, the cap 22, and the stator core 231 to prevent a vibration in any of the above members from affecting any other member. As a result, a further reduction in the vibrations of the motor 12 is achieved.

As illustrated in FIG. 1, the number of blades 112 is preferably seven, for example, according to the present preferred embodiment. Therefore, the number of blades 112, which are configured to rotate together with the shaft 31, and the number of teeth 52 are relatively prime (i.e., do not contain any common multiples). This contributes to preventing vibrations due to the blades 112, which are a main cause for periodic vibrations, and vibrations due to the teeth 52 from resonating with each other. As a result, a reduction in vibrations of the blower 1 as a whole is achieved.

In addition, the number of blades 112 and the number of stator contact portions 511 are relatively prime (i.e., do not contain any common multiples). This contributes to preventing vibrations which are transferred from the teeth 52 to the housing and the cap 22 through the stator contact portions 511 and vibrations which are transferred from the blades 112 to the housing 21 and the cap 22 through the shaft 31 from resonating with each other. Thus, a further reduction in the vibrations of the motor 12 is achieved.

Thus, according to the present preferred embodiment, the vibration characteristics of the vibrations which are transferred from the stator 23 to the housing 21 through the stator contact portions 511 and the vibration characteristics of the vibrations which are transferred from the housing 21 to the cap 22 through the cap contact portions 71 are different from each other. This contributes to preventing resonance of the housing 21 and the cap 22, and to reducing the vibrations of the motor 12 as a whole. In addition, because the cap contact portions 71 are provided on portions of the housing tubular portion 212 at which relatively strong vibrations tend to easily occur, a reduction in the vibrations of the housing tubular portion 212 is achieved. Thus, according to the present preferred embodiment, the vibrations of the motor are efficiently reduced.

While preferred embodiments of the present invention have been described above, it is to be understood that the present invention is not limited to the above-described preferred embodiments and various modifications thereof are possible.

Figure 4:
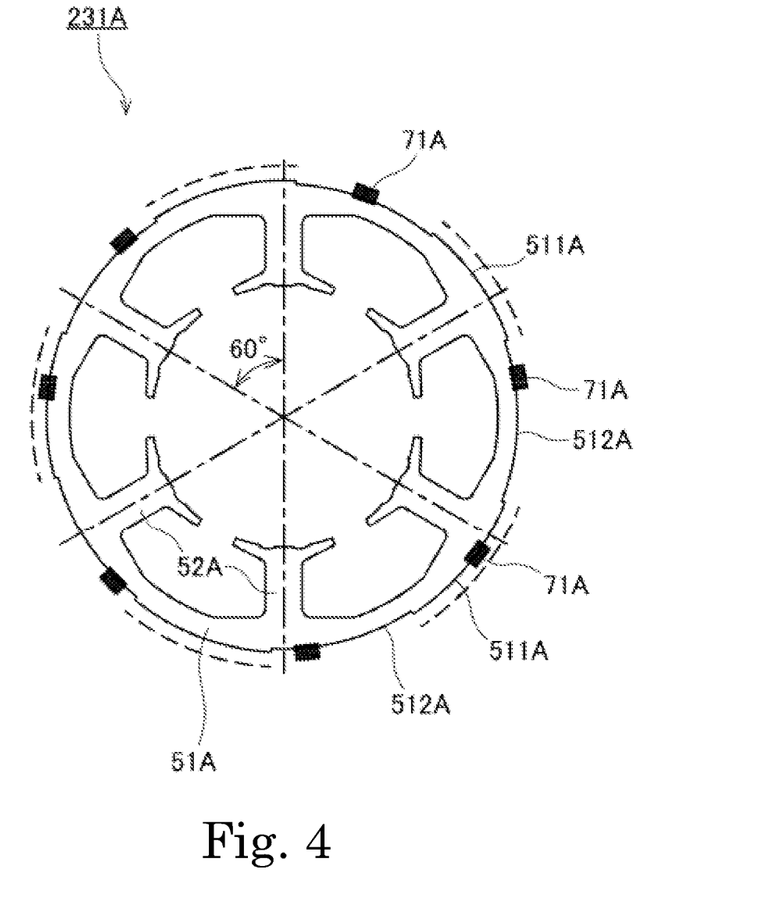
FIG. 4 is a horizontal cross-sectional view of a stator core according to an example modification of the first preferred embodiment of the present invention.

FIG. 4 is a horizontal cross-sectional view of a stator core 231A of a motor according to an example modification of the above-described preferred embodiments. The stator core 231A preferably includes an annular core back 51A and a plurality of teeth 52A which project radially inward from the core back 51A. In FIG. 4, circumferential positions of cap contact portions 71A are shown. In the modification illustrated in FIG. 4, the number of cap contact portions 71A preferably is seven, for example, and the seven cap contact portions 71A are located at regular or substantially regular intervals in the circumferential direction. Meanwhile, the number of stator contact portions 511A is preferably five as in the above-described preferred embodiment, and the five stator contact portions 511A are located at regular intervals in the circumferential direction.

As illustrated in FIG. 4, a tubular outer circumferential surface of the core back 51A includes the plurality of stator contact portions 511A and a plurality of non-contact portions 512A. Each stator contact portion 511A projects radially outward relative to each of the non-contact portions 512A, which are remaining portions of the outer circumferential surface of the core back 51A. The stator contact portions 511A are spaced from one another in the circumferential direction. That is, the stator contact portions 511A and the non-contact portions 512A are arranged to alternate with each other in the circumferential direction.

As in the modification illustrated in FIG. 4, the number of cap contact portions 71A and the number of stator contact portions 511A may be arranged to be relatively prime (i.e., do not contain any common multiples). This arrangement contributes to preventing vibrations which are transferred from the cap to the housing and vibrations which are transferred from the stator to the housing from resonating with each other. In this case, even if both the cap contact portions 71A and the stator contact portions 511A are located at regular or substantially regular intervals in the circumferential direction, a reduction in resonance of the vibrations which are transferred from the cap to the housing and the vibrations which are transferred from the stator to the housing is achieved.

Figure 5:
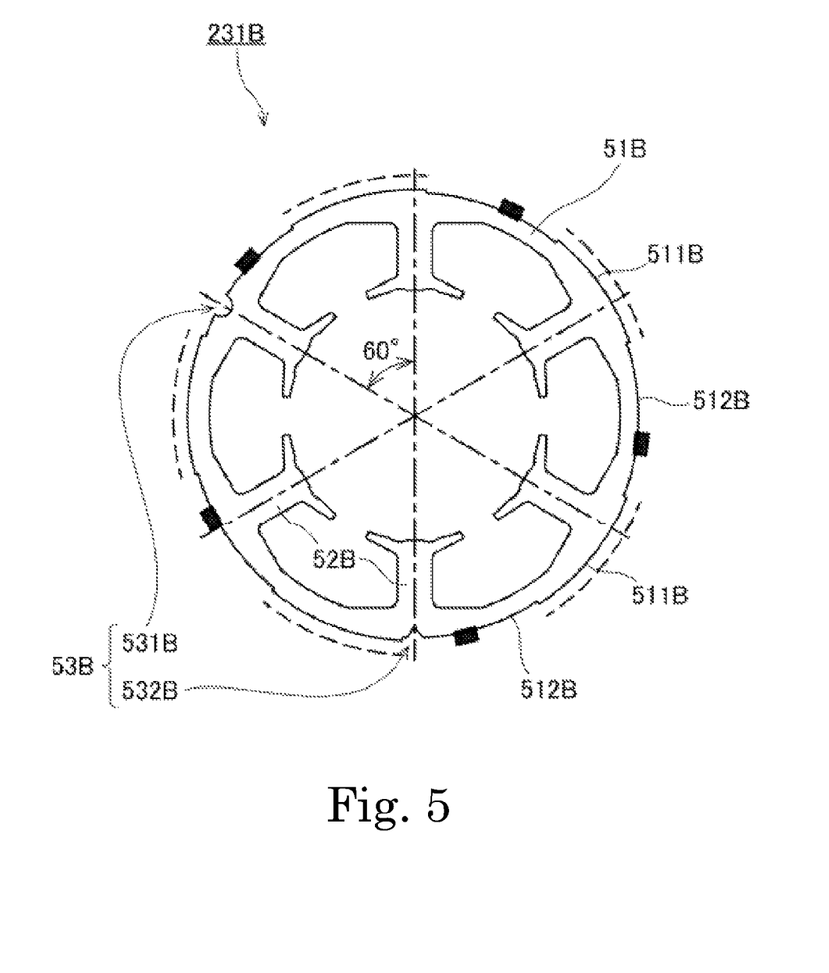
FIG. 5 is a horizontal cross-sectional view of a stator core according to an example modification of the first preferred embodiment of the present invention.

FIG. 5 is a horizontal cross-sectional view of a stator core 231B of a motor according to another example modification of the above-described preferred embodiments. In the modification illustrated in FIG. 5, a tubular outer circumferential surface of a core back 51B preferably includes a plurality of stator contact portions 511B and a plurality of non-contact portions 512B. Each of the stator contact portions 511B projects radially outward relative to each of the non-contact portions 512B, which are remaining portions of the outer circumferential surface of the core back 51B. The stator contact portions 511B are spaced from one another in the circumferential direction. That is, the stator contact portions 511B and the non-contact portions 512B are arranged to alternate with each other in the circumferential direction. In addition, in the modification illustrated in FIG. 5, the stator core 231B preferably includes notch marks 53B. The notch marks 53B preferably include a first mark 531B and a second mark 532B. Each notch mark 53B is a notch recessed radially inward from the outer circumferential surface of the core back 51B.

The first mark 531B and the second mark 532B have different shapes, and the first mark 531B and the second mark 532B are spaced from each other by an angle sufficiently smaller than 180 degrees. This makes it easier to identify front and rear sides of each electromagnetic steel sheet, for example, when the electromagnetic steel sheets are placed one upon another to produce the stator core 231B, or when the stator core 231B is press fitted to the housing. That is, manufacturing efficiency is improved.

Almost no magnetic flux flows in portions of the core back 51B which are radially outside of teeth 52B even while the motor is running. Accordingly, the notch marks 53B are arranged in the above portions where the notch marks 53B will not affect a flow of the magnetic flux in the stator core 231B.

In the modification illustrated in FIG. 5, each stator contact portion 511B is located at a circumferential position different from the circumferential position of either notch mark 53B. Thus, each notch mark 53B is prevented from causing a circumferential division of any stator contact portion 511B or a reduction in the circumferential width of any stator contact portion 511B. This contributes to preventing a deformation of the stator core 231B due to press fitting, and to preventing a reduction in the strength with which the housing and the stator core 231B are fixed to each other.

Figure 6:
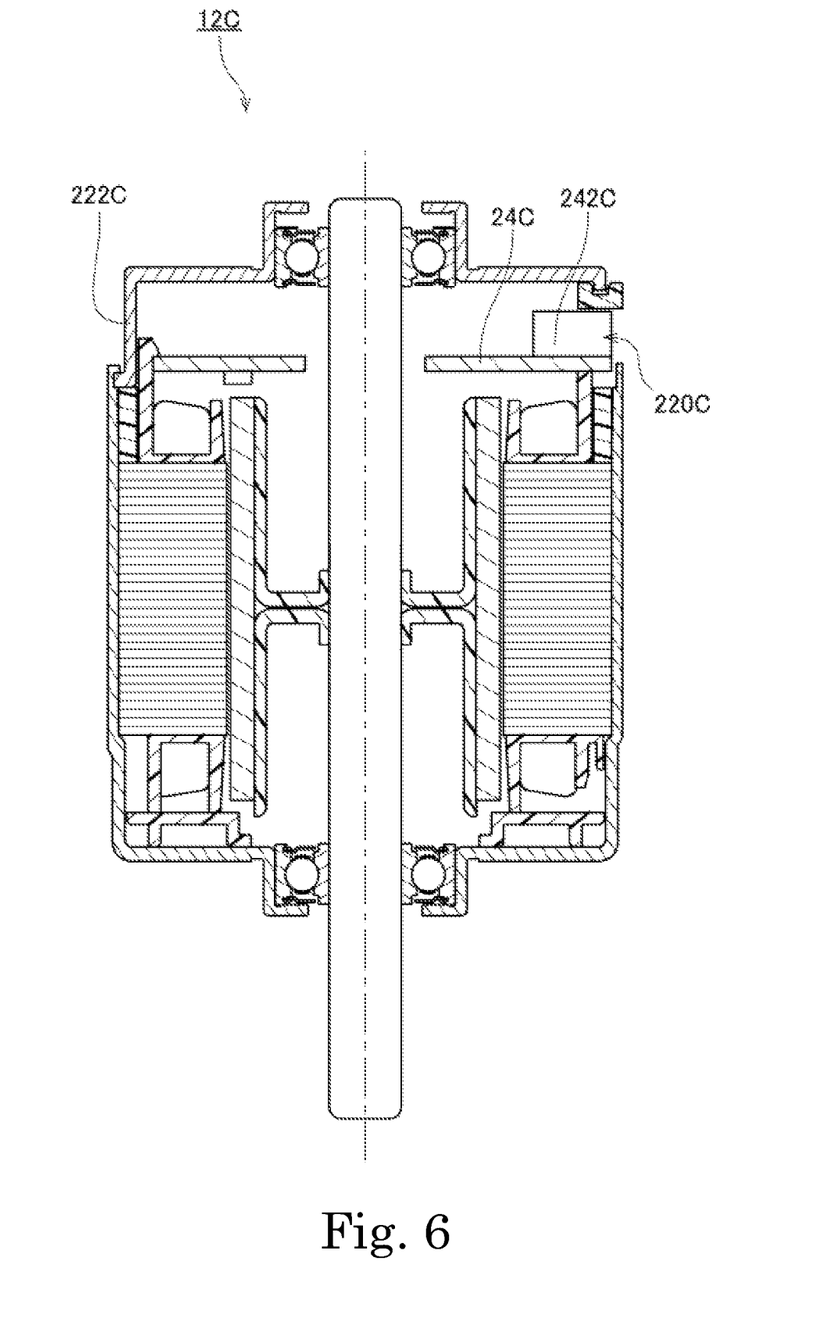
FIG. 6 is a vertical cross-sectional view of a motor according to an example modification of the first preferred embodiment of the present invention.

FIG. 6 is a vertical cross-sectional view of a motor 12C according to another example modification of the above-described preferred embodiments. In the modification illustrated in FIG. 6, the motor 12C preferably includes a circuit board 24C. In addition, in the modification illustrated in FIG. 6, the motor 12C preferably includes a connector 242C in place of the lead wire. The connector 242C is arranged in an external connection portion 220C defined in a cap tubular portion 222C. Thus, electrical connection between the circuit board and an outside may be accomplished by the lead wire or any other desirable element, such as, for example, the connector. For example, a portion of the circuit board 24 may be passed through the external connection portion to be exposed to an outside of the case defined by the housing and the cap.

The motor according to the above-described preferred embodiment of the present invention is preferably used in a blower. Note, however, that motors according to other preferred embodiments of the present invention may be used in office automation appliances, such as printers and copy machines, transportation equipment, such as automobiles, household electrical appliances, medical appliances, disk drives, blower fans, and the like to generate a variety of driving forces.

Note that the detailed shape of the motor may be different from the shape thereof as illustrated in the accompanying drawings of the present application. Also note that features of the above-described preferred embodiments and the modifications thereof may be combined appropriately as long as no conflict arises.

Preferred embodiments of the present invention and modifications thereof are applicable to, for example, motors and blowers.

Features of the above-described preferred embodiments and the modifications thereof may be combined appropriately as long as no conflict arises.

While preferred embodiments of the present invention and modifications thereof have been described above, it is to be understood that variations and additional modifications will be apparent to those skilled in the art without departing from the scope and spirit of the present invention. The scope of the present invention, therefore, is to be determined solely by the following claims.

What is claimed is:

1. A motor comprising:
   a shaft which extends along a rotation axis extending in a vertical direction;
   a rotor magnet configured to rotate together with the shaft;
   a stator located radially outside of the rotor magnet;
   a housing including a housing tubular portion which extends along the rotation axis;
   a cap located at an axially upper end portion of the housing; and
   a bearing portion configured to rotatably support the shaft, and supported by at least one of the housing and the cap; wherein
   the stator includes a stator core including an annular core back and a plurality of teeth which project radially inward from the core back;
   the core back includes a tubular outer circumferential surface, the outer circumferential surface including a plurality of stator contact portions each of which is in contact with the housing tubular portion;
   the stator contact portions are spaced from one another in a circumferential direction;
   the cap includes:
     a cap bottom portion perpendicular or substantially perpendicular to the rotation axis; and
     a cap tubular portion extending axially downward from the cap bottom portion;
   the cap tubular portion includes a plurality of cap contact portions each of which is in contact with the housing;
   the cap contact portions are spaced from one another in the circumferential direction; and
   at least one of the cap contact portions is located at a circumferential position different from a circumferential position of each of the stator contact portions.

2. The motor according to claim 1, wherein each of all the cap contact portions is located at a circumferential position different from the circumferential position of each of the stator contact portions.

3. The motor according to claim 2, wherein a circumferential middle of at least one of the stator contact portions is located at a circumferential position different from a circumferential position of a circumferential middle of each of the teeth.

4. The motor according to claim 1, wherein a number of the plurality of teeth and a number of the plurality of stator contact portions are relatively prime so as to not contain any common multiples.

5. The motor according to claim 4, wherein the number of teeth and a number of cap contact portions are relatively prime so as to not contain any common multiples.

6. The motor according to claim 1, wherein
   the bearing portion is a ball bearing; and
   a number of balls of the ball bearing and a number of the plurality of teeth are relatively prime so as to not contain any common multiples.

7. The motor according to claim 1, wherein a number of the plurality of stator contact portions is a prime number equal to or greater than five.

8. The motor according to claim 7, wherein a number of the plurality of cap contact portions is a prime number equal to or greater than five.

9. The motor according to claim 8, wherein the cap contact portions are asymmetrical about the rotation axis.

10. The motor according to claim 6, wherein
    the housing further includes:
      a housing bottom portion which at least partially closes an axially lower end portion of the housing tubular portion; and
      a first bearing holding portion which projects axially downward from the housing bottom portion;
    the cap further includes a second bearing holding portion which projects axially upward from the cap bottom portion; and
    the bearing portion is fixed to each of the first bearing holding portion and the second bearing holding portion.

11. The motor according to claim 1, wherein each of the stator contact portions projects radially outward relative to remaining portions of the outer circumferential surface of the core back.

12. The motor according to claim 11, wherein the housing tubular portion has an axial dimension greater than an axial dimension of the stator core.

13. The motor according to claim 12, wherein each of the stator contact portions has a circumferential width greater than a circumferential width of each of the teeth.

14. The motor according to claim 13, wherein
the outer circumferential surface of the core back further includes non-contact portions, each of which is not in contact with the housing tubular portion;
the stator contact portions and the non-contact portions alternate with each other in the circumferential direction; and
a combined circumferential width of the stator contact portions is greater than a combined circumferential width of the non-contact portions.

15. The motor according to claim 14, wherein each of the stator contact portions has a circumferential width greater than a circumferential width of each of the cap contact portions.

16. The motor according to claim 15, further comprising a vibration isolator arranged between a lower surface of the cap and an upper surface of the stator core.

17. The motor according to claim 1, further comprising a circuit board configured to supply electric currents to the stator, wherein
at least a portion of the circuit board is located in a space enclosed by the housing and the cap;
the circuit board is positioned axially above the stator core to be perpendicular or substantially perpendicular to the rotation axis; and
an upper surface of the circuit board is located at an axial level higher than an axial level of an upper end portion of the housing.

18. The motor according to claim 17, wherein
the stator further includes:
an insulator configured to cover a portion of a surface of the stator core; and
a conducting wire wound around each of the teeth with the insulator intervening therebetween;
the insulator includes:
a cover portion configured to cover an upper end surface of the stator core; and
a board support portion which projects axially upward from the cover portion; and
the circuit board is supported by the board support portion.

19. The motor according to claim 18, wherein
the cap tubular portion includes an external connection portion defined by a hole or a cut passing through the cap tubular portion in a radial direction;
a portion of the circuit board, a lead wire connected to the circuit board, or a connector connected to the circuit board is provided in the external connection portion; and
each cap contact portion is located at a circumferential position different from a circumferential position of the external connection portion.

20. A blower comprising:
the motor according to claim 6; and
a plurality of blades configured to rotate together with the shaft; wherein
a number of the plurality of blades and a number of the plurality of teeth are relatively prime so as to not contain any common multiples.

21. A blower comprising:
the motor according to claim 7; and
a plurality of blades configured to rotate together with the shaft; wherein
a number of the plurality of blades and a number of the plurality of stator contact portions are relatively prime so as to not contain any common multiples.

* * * * *